(12) United States Patent
Chan et al.

(10) Patent No.: US 6,272,491 B1
(45) Date of Patent: Aug. 7, 2001

(54) METHOD AND SYSTEM FOR MASTERING LOCKS IN A MULTIPLE SERVER DATABASE SYSTEM

(75) Inventors: Wilson Wai Shun Chan, San Mateo; Tak Fung Wang, Hayward; Patricia Grewell, San Mateo, all of CA (US)

(73) Assignee: Oracle Corporation, Redwood Shores, CA (US)

( * ) Notice: Subject to any disclaimer, the term of this patent is extended or adjusted under 35 U.S.C. 154(b) by 0 days.

(21) Appl. No.: 09/139,042

(22) Filed: Aug. 24, 1998

(51) Int. Cl.$^7$ .................................................. G06F 17/30
(52) U.S. Cl. ..................... 707/8; 707/2; 707/3; 707/102; 707/200; 707/7
(58) Field of Search ................... 707/8, 200, 7, 707/102, 3, 2

(56) References Cited

U.S. PATENT DOCUMENTS

| | | | |
|---|---|---|---|
| 5,612,856 | * | 3/1997 | Albach .................................. 363/20 |
| 6,058,389 | * | 5/2000 | Chandra et al. ......................... 707/1 |
| 6,081,900 | * | 6/2000 | Subramaniam et al. ............. 713/201 |
| 6,108,654 | * | 8/2000 | Chan et al. ............................. 707/8 |

* cited by examiner

Primary Examiner—Hosain T. Alam
Assistant Examiner—Jean M Corrielus
(74) Attorney, Agent, or Firm—Hickman Palermo Truong & Becker LLP; Brian D. Hickman

(57) ABSTRACT

A method and apparatus are provided for managing resources in a system that has multiple nodes. Each resource of a plurality of resources is assigned to a lock club of a plurality of lock clubs. A master node is assigned to each lock club of the plurality of lock clubs. All resources that belong to each given lock club are mastered at the master node assigned to the given lock club. Club-to-master mapping information that indicates the master node for each lock club of the plurality of lock clubs is maintained. Which of the multiple nodes is a master node for a particular resource is determined by inspecting the club-to-master mapping to determine the master node assigned to the lock club to which the particular resource belongs. The system may use directory nodes by storing the club-to-master mapping information for each lock club on a directory node that is selected for the lock club by applying a hash function to the name of the lock club. Alternatively, a name server may be used to maintain the club-to-master mapping information for all lock clubs of the plurality of lock clubs on all nodes of the multiple nodes.

24 Claims, 4 Drawing Sheets

METHOD AND SYSTEM FOR MASTERING LOCKS IN A MULTIPLE SERVER DATABASE SYSTEM

FIELD OF THE INVENTION

The present invention relates to lock management, and more specifically, to lock management within a multiple server database system.

BACKGROUND OF THE INVENTION

Database servers use resources while executing transactions. Even though resources may be shared between database servers, many resources may not be accessed in certain ways by more than one process at any given time. For example, resources such as data blocks of a storage medium or tables stored on a storage medium may be concurrently accessed in some ways (e.g. read) by multiple processes, but accessed in other ways (e.g. written to) by only one process at a time. Consequently, mechanisms have been developed which control access to resources.

One such mechanism is referred to as a lock. A lock is a data structure that indicates that a particular process has been granted certain rights with respect to a resource. There are many types of locks. Some types of locks may be shared on the same resource by many processes, while other types of locks prevent any other locks from being granted on the same resource.

The entity responsible for granting locks on resources is referred to as a lock manager. In a single node database system, a lock manager will typically consist of one or more processes on the node. In a multiple-node system, such as a multi-processing machine or a local area network, a lock manager may include processes distributed over numerous nodes. A lock manager that includes components that reside on two or more nodes is referred to as a distributed lock manager.

FIG. 1 is a block diagram of a multiple-node computer system 100. Each node has stored therein a database server and a portion of a distributed lock management system 132. Specifically, the illustrated system includes three nodes 102, 112 and 122 on which reside database servers 104, 114 and 124, respectively, and lock manager units 106, 116 and 126, respectively. Database servers 104, 114 and 124 have access to the same database 120. The database 120 resides on a disk 118 that contains multiple blocks of data. Disk 118 generally represents one or more persistent storage devices which may be on any number of machines, including but not limited to the machines that contain nodes 102, 112 and 122.

A communication mechanism allows processes on nodes 102, 112, and 122 to communicate with each other and with the disks that contain portions of database 120. The specific communication mechanism between the nodes and disk 118 will vary based on the nature of system 100. For example, if the nodes 102, 112 and 122 correspond to workstations on a network, the communication mechanism will be different than if the nodes 102, 112 and 122 correspond to clusters of processors and memory within a multi-processing machine.

Before any of database servers 104, 114 and 124 can access a resource shared with the other database servers, it must obtain the appropriate lock on the resource from the distributed lock management system 132. Such a resource may be, for example, one or more blocks of disk 118 on which data from database 120 is stored.

Lock management system 132 stores data structures that indicate the locks held by database servers 104, 114 and 124 on the resources shared by the database servers. If one database server requests a lock on a resource while another database server has a lock on the resource, the distributed lock management system 132 must determine whether the requested lock is consistent with the granted lock. If the requested lock is not consistent with the granted lock, then the requester must wait until the database server holding the granted lock releases the granted lock.

According to one approach, lock management system 132 maintains one master resource object for every resource managed by lock management system 132, and includes one lock manager unit for each node that contains a database server. The master resource object for a particular resource stores, among other things, an indication of all locks that have been granted on or requested for the particular resource. The master resource object for each resource resides within only one of the lock manager units 106, 116 and 126.

The node on which a lock manager unit resides is referred to as the "master node" (or simply "master") of the resources whose master resource objects are managed by that lock manager unit. Thus, if the master resource object for a resource R1 is managed by lock manager unit 106, then node 102 is the master of resource R1.

In typical systems, a hash function is employed to select the particular node that acts as the master node for a given resource. For example, system 100 includes three nodes, and therefore may employ a hash function that produces three values: 0, 1 and 2. Each value is associated with one of the three nodes. The node that will serve as the master for a particular resource in system 100 is determined by applying the hash function to the name of the resource. All resources that have names that hash to 0 are mastered on node 102. All resources that have names that hash to 1 are mastered on node 112. All resources that have names that hash to 2 are mastered on node 122.

When a process on a node wishes to access a resource, a hash function is applied to the name of the resource to determine the master of the resource, and a lock request is sent to the master node for that resource. The lock manager on the master node for the resource controls the allocation and deallocation of locks for the associated resource.

While the hashing technique described above tends to distribute the resource mastering responsibility evenly among existing nodes, it has some significant drawbacks. For example, it is sometimes desirable to be able to select the exact node that will function as master node to a lock resource. For example, consider the situation when a particular lock resource is to be accessed exclusively by processes residing on node 102. In this situation, it would be inefficient to have the lock resource and the request queue for that resource located on any node in the network other than node 102. However, the relatively random distribution of lock resource management responsibilities that results from the hash function assignment technique makes it unlikely that resources will be mastered at the most efficient locations.

Further, lock resources that cover different resources often relate to the same overall object on the system. For example, a tablespace is a storage area that may contain a plurality of rows. Each of the rows in the tablespace may be associated with separate resource lock resources. However, each of those separate lock resources also relates to the same object (i.e. the tablespace). In operation, it may improve efficiency if the related lock resources are all located on the same node for easy access by any process that needs to work with the object as a whole (as opposed to the individual resources). However, using the hashing assignment technique, the related lock resources may end up being mastered on multiple nodes in the distributed system.

Changing the master of a lock resource from one node to another is referred to as "remastering" the lock resource. A lock resource may be remastered, for example, prior to a shutdown of the node currently mastering the lock resource. Using resource name hashing techniques, lock resources are remastered individually on a per-lock resource basis, and cannot be remastered as a group to the same node.

In addition, under certain circumstances, a process may wish to perform an operation that affects an entire group of lock resources. Using the resource name hashing approach, the operation would have to be performed on each individual lock resource.

Based on the foregoing, there is a need for a method and system that allows a particular node to be selected as master node for a lock resource, and more particularly, which allows groups of associated lock resources to be mastered and remastered as a unit, rather than individually.

SUMMARY OF THE INVENTION

A method and apparatus are provided for managing resources in a system that has multiple nodes. Each resource of a plurality of resources is assigned to a lock club of a plurality of lock clubs. A master node is assigned to each lock club of the plurality of lock clubs. All resources that belong to each given lock club are mastered at the master node assigned to the given lock club. Club-to-master mapping information that indicates the master node for each lock club is maintained. Which of the multiple nodes is a master node for a particular resource is determined by inspecting the club-to-master mapping to determine the master node assigned to the lock club to which the particular resource belongs.

With respect to the club-to-master mapping, the system may use directory nodes by storing the club-to-master mapping information for each lock club on a directory node that is selected for the lock club by applying a hash function to the name of the lock club. Alternatively, a name server may be used to maintain and replicate the club-to-master mapping information for all lock clubs on all nodes.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for managing lock resources is described. In the following description, for the purposes of explanation, numerous specific details are set forth in order to provide a thorough understanding of the present invention. It will be apparent, however, to one skilled in the art that the present invention may be practiced without these specific details. In other database servers, well-known structures and devices are shown in block diagram form in order to avoid unnecessarily obscuring the present invention.

HARDWARE OVERVIEW

Figure 1:
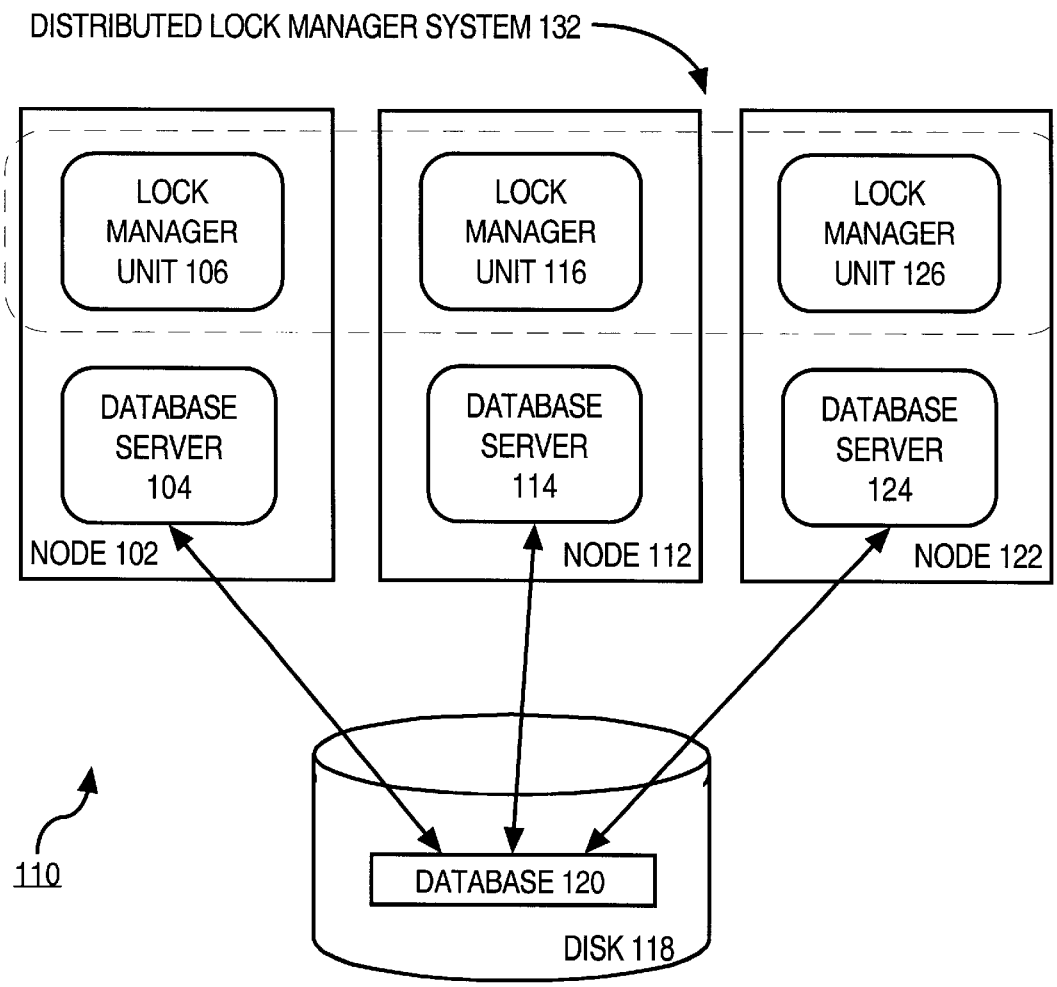
FIG. 1 is a block diagram of a computer system having a distributed lock manager.
Figure 2:
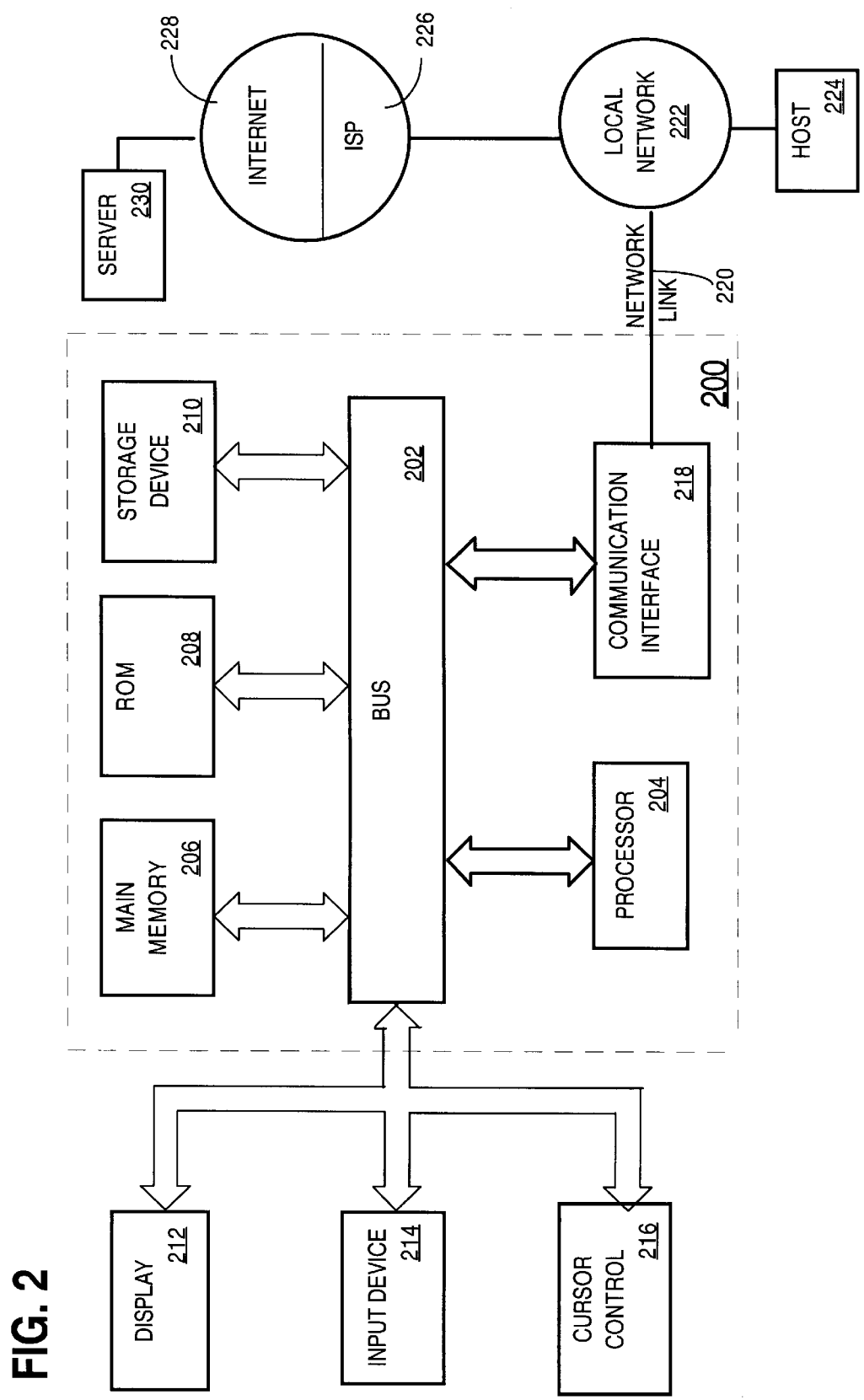
FIG. 2 is a block diagram of a computer system that may be used to implement embodiments of the present invention.

FIG. 2 is a block diagram that illustrates a computer system 200 upon which an embodiment of the invention may be implemented. Computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The invention is related to the use of computer system 200 for managing lock resources. According to one embodiment of the invention, lock resource management is provided by computer system 200 in response to processor 204 executing one or more sequences of one or more instructions contained in main memory 206. Such instructions may be read into main memory 206 from another computer-readable medium, such as storage device 210. Execution of the sequences of instructions contained in main memory 206 causes processor 204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 204 for execution. Such a medium may take many forms, including but not limited to, non-volatile media, volatile media, and transmission media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218. In accordance with the invention, one such downloaded application provides for lock resource management as described herein.

The received code may be executed by processor 204 as it is received, and/or stored in storage device 210, or other non-volatile storage for later execution. In this manner, computer system 200 may obtain application code in the form of a carrier wave.

LOCK CLUBS

According to one aspect of the invention, the various drawbacks associated with resource name hashing techniques discussed above are addressed through the use of lock clubs. A lock club is a group of lock resources. When a lock resource is created, it may be assigned to a particular lock club. Each lock club has a master node. With the possible exception of randomly mastered lock clubs that will be described hereafter, the master node for a lock club is responsible for mastering all lock resources that belong to the lock club.

By making the master node assignments for lock resources based on lock club membership, it is possible to ensure that related lock resources are mastered by the same node. For example, the lock resources for all rows in a particular tablespace may be assigned to a particular club. The node that masters that particular club will therefore master all rows for that particular tablespace. As shall be described in greater detail hereafter, various techniques may be used to ensure that lock clubs are mastered by the nodes that will most efficiently master the lock resources that belong to the lock clubs.

DIRECTORY NODES

According to one embodiment, in addition to a master node, each lock club also has a directory node. The directory node for a lock club is determined by applying the name of the lock club to a hash function. For example, if the name of Club1 hashes to a value assigned to node 112, node 112 will serve as the directory node for Club1.

Significantly, the directory node for a lock club is not necessarily the master node for the lock club. Rather, the directory node for a lock club is merely the node that is responsible for containing information regarding the identity of the master node for the lock club. Thus, node 112 may be the directory node for Club1, but node 102 may actually be the master for Club1. In this case, node 112 would contain club-to-master mapping information that indicates that node 102 is the master node for Club1.

The use of directory nodes divorces the master node assignment operation from the hash function result. Specifically, the node that masters a lock club is not dictated by the name of the lock club or the hash function that is applied to the name of the lock club. As a result, efficiency considerations may be used to select the most appropriate masters for each lock club, rather than relying on chance. Further, once the most efficient master for a lock club has been selected, neither the name of the club nor the hash function itself need be modified. This holds true both for when a lock club is initially assigned a master node, and when the lock club is remastered to another node.

For example, assume that the name of Club1 hashes to node 112, and that a database administrator determines that node 102 would be the most efficient master of the lock resources within Club1. To assign node 102 the responsibility of mastering Club1, data is stored on node 112 to indicate that Club1 is mastered at node 102. If, at a future point in time, it is determined that Club1 would be most efficiently mastered at node 122, the club-to-master mapping on node 112 can be changed accordingly without changing the name of Club1 nor the hash function that is applied to the name to determine the directory node.

Figure 3:
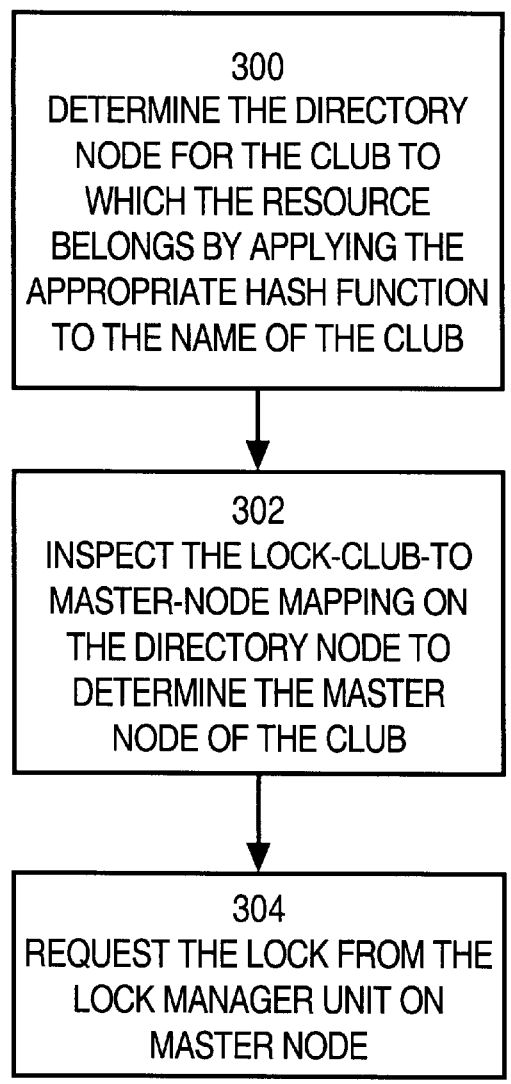
FIG. 3 is a flowchart illustrating steps performed to determine the master node of a resource according to an embodiment of the invention.

In a system that employs directory nodes as described above, a process that desires to access a resource performs the steps illustrated in FIG. 3. At step 300, the directory node for the club to which the resource belongs is determined by applying the appropriate hash function to the name of the club. At step 302, the club-to-master-node mapping stored on the directory node is inspected to determine the master node for the club. Once the master node for the club is determined, a lock request is sent to the master node (step 304). The lock request indicates that the process desires a particular type of lock on the resource in question, and the master node responds appropriately.

PARTITIONED TABLESPACE EXAMPLE

One situation in which it would be valuable to designate which node in a multi-node system will master a set of lock resources is a situation in which tablespaces have been partitioned among the various nodes. Due to the partitioning, any given tablespace will be "owned" by a particular node. Consequently, resources within that tablespace will be accessed primarily by the database server on that particular node. Therefore, designating that particular node to be the master of the lock resources for the resources in that partition can significantly decrease the overhead (e.g. inter-node communication) associated with lock resource management.

For example, assume that the partitioning operation assigns tablespaces A and B to node 102, tablespaces C and D to node 112, and tablespaces E and F to node 122. To ensure that the lock resources for the resources in each of the tablespaces are mastered together, the lock resources for the resources associated with tablespaces A, B, C, D, E and F may be respectively assigned to lock clubs A, B, C, D, E and F. Assume that the names of lock clubs A, C and E hash to node 102, the names of lock clubs D and F hash to node 112, and the name of lock club B hashes to node 122.

Figure 4:
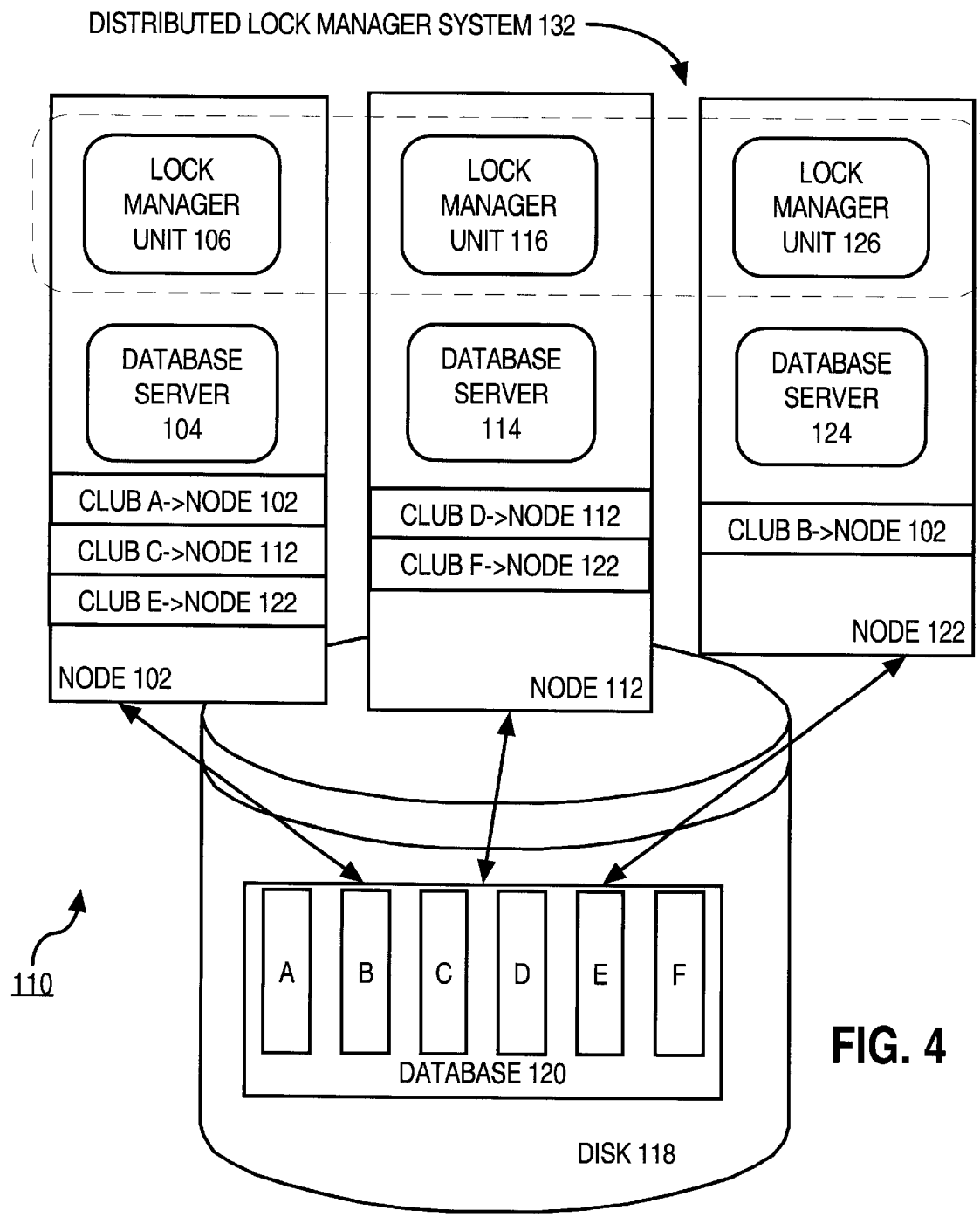
FIG. 4 is a block diagram of a computer system that implements directory nodes and lock clubs according to an embodiment of the invention.

Based on this configuration, the database administrator can make the most efficient lock resource mastering assignment by storing the appropriate club-to-master information on the various nodes, as shown in FIG. 4. Specifically, the club-to-master information on node 102 indicates that lock club A is mastered on node 102, lock club C is mastered on node 112 and lock club E is mastered on node 122. The club-to-master information on node 112 indicates that lock club D is mastered on node 112 and lock club F is mastered on node 122. The club-to-master information on node 122 indicates that lock club B is mastered at node 102.

LOCK CLUB CREATION

According to one embodiment of the invention, a lock club may be created either implicitly or explicitly. A lock club is created implicitly at the first attempt to open a lock resource using a new club identifier. In response to the lock resource open attempt, a lock club with the new club identifier is created, and the lock resource being opened is assigned as a member of the new lock club. When a new club is created implicitly, no master for the club has been specified. In this case, the user may be prompted to specify a master, the club may be mastered on the node opening the lock resource, or the club may be established as a randomly mastered club.

A randomly mastered club may be implemented in a variety of ways. For example, a randomly mastered club may be randomly assigned a master, where all lock resources in the club are mastered by the club's master. On the other hand, a randomly mastered club may be implemented such that all lock resources within the club are randomly assigned masters.

A lock club is created explicitly by identifying a node as master of a new club. In response to an explicit club creation, the name of the new club is fed to a hash function to identify the directory node for the new club. Once the directory node is identified, mapping data is stored on the directory node to identify the new club and indicate the master of the new club.

LOCK RESOURCE-TO-CLUB ASSIGNMENT

According to one embodiment, lock resources are assigned to a particular lock club at the time the lock resources are created ("opened"). The routine responsible for opening a lock resource receives, as an input parameter, the name of a lock club. The name of the lock club is fed to a hash function to determine the directory node for the lock club. The directory node is then consulted to determine the master node for the specified lock club. The master for the lock club is then used to create and maintain the information for the newly opened lock resource.

LOCK CLUB OBJECTS

According to an embodiment of the invention, a data structure is created for each lock club. The data structure for a lock club, referred to herein as a lock club object, includes the name of the club, a master node identifier that indicates the node on which the club is mastered, and a resource queue. In response to adding a resource to a lock club, a link to the lock club object is stored in the resource. Consequently, any process in possession of the resource may follow the link contained in the resource to determine the lock club to which the resource belongs.

Because the club object identifies the master of the club, a database server that has access to a resource that belongs to the club may follow the link to the club object and use the information in the club object to determine the node that masters the club, thus avoiding the need to hash the name of the lock club to determine a directory node, and access directory node to determine the master node of the club. This could be done, for example, by maintaining part of the lock club object data structure locally, when the lock club object is created.

REMASTERING A LOCK CLUB

Under certain circumstances, it may be desirable to change the master of a lock club. For example, it may be desirable to change the master of club C from node 112 to node 102 in response to assigning node 102 to be responsible for partition C. Alternatively, it may be desirable to change the master of clubs A and B from node 102 to other nodes in response to a planned shutdown of node 102.

According to one embodiment, remastering a club is performed in four phases. During the first phase, the current master of the club sends a "remastering" message to all nodes that are currently interested in the club. The nodes that are currently interested in the club include those nodes that currently have been granted locks on, or are on the waiting list for locks on, resources that belong to the club. The master node determines which nodes are interested in the club based on information reflected in the lock resource objects that belong to the club.

During the second phase, the current master of the club waits for responses from the interested nodes. In the responses, the interested nodes acknowledge receipt of the remastering message. After sending an acknowledgement, the interested nodes suspend sending any lock related requests for the lock resources that belong to the club.

During the third phase, the data structures associated with the lock club and the lock resources within the lock club are moved to the new master for the lock club. When a club obtains a new master node, all lock resources which where previously opened in that club are migrated to the new node automatically by the lock resource manager. This happens whether the club was previously randomly mastered or previously mastered on another node. If the current master receives any lock requests during this phase, the current master responds with messages indicating that the lock club is in the process of being remastered. In addition, the nodes that send such requests are added to the "interested nodes" list.

The fourth phase begins when all of the structures necessary for mastering the new lock club have been created on the new master. At this point, the new master sends messages to all interested nodes to indicate that it is available to handle lock requests for lock resources that belong to the club. In addition, the club-to-master mapping information is changed to reflect the new master of the club.

AUTOMATED REMASTERING

In general, remastering a lock club is not a fast operation, and therefore should not be performed with great frequency. However, remastering under the right conditions may lead to significant savings. According to one embodiment of the invention, the database system is configured to recognize these situations and automatically remaster the lock club when they occur.

For example, upon receiving a request for a lock resource in a lock club, the master of the lock club may determine that the requesting node is the only node that holds any locks on resources in the club. This suggests that it would be more efficient to master the club at the requesting node, thereby eliminating the inter-node communication required by lock resource-related messages between the current master and the requesting node. To further decrease the frequency of automatic remastering operations, the master may be configured to initiate the remastering only after a predetermined amount of time has passed in which the other node is the only node to hold any locks on resources in the club.

Automatic remastering may also be performed in response to a change in the ownership of a partition. For example, a club of lock resources associated with resources that belong to a particular partition may be remastered from a first node to a second node when responsibility for the partition is transferred from the first node to the second node.

Automatic remastering may also be performed in response to conditions that are not directly related to lock resource management. For example, if a particular node is running out of available memory, the node may transfer one or more lock clubs to other nodes to free up the memory being used by the lock resource structures that belong to those clubs. In addition, when nodes are added or removed from the system, lock clubs can be remastered to more evenly spread the lock resource mastery

REPLICATED MAPPINGS

According to one embodiment of the invention, all club-to-master mappings are replicated to all nodes in the distributed database system. By giving each node local access to the entire club-to-master mapping, the need to maintain and access directory nodes is eliminated. Specifically, a process that needs to use a resource simply reads the locally stored club-to-master mapping to determine the master of the club that includes a desired resource, and then sends a lock request directly to the master of the resource.

Replicating the club-to-master mapping information on all nodes involves significantly less overhead than, for example, replicating resource-to-master mapping information. Specifically, the club-to-master mapping involves significantly less information than a resource-to-master mapping, since a single lock club will typically cover many (e.g. a hundred thousand) resources. In addition, the club-to-master mapping will typically remain relatively static, since club remastering should be an uncommon event.

One technique for replicating the club-to-master mapping on each node is through the use of a name server. A name server is a node, accessible to all other nodes, that has been designated to maintain the club-to-master mapping for all clubs. When a new club is created, the node creating the club updates an entry in the name server to indicate the master of the new club. The name server then broadcasts the club-to-master information for the new club to all other nodes. Those other nodes update their respective locally-stored club-to-master mapping to include the club-to-master mapping for the new club.

ALTERNATE MASTERS

According to one embodiment of the invention, two masters are designated for each lock club: a primary master and an alternate master. Under normal conditions, the primary master serves as the master of the lock club. However, if the primary master fails or is otherwise non-responsive, the alternate master assumes responsibility for the lock resources in the club. Thereafter, lock resource related requests for lock resources that belong to the club are directed to the alternate master. Consequently, the club-to-master mapping information for a particular club specifies both the primary and alternate masters of the lock club.

When neither the primary nor the alternate master of a club is available, various techniques may be used to determine how to master the club. According to one embodiment, the lock club becomes a randomly mastered club under these circumstances.

FAILURE RECOVERY

The use of lock clubs reduces the overhead associated with recovering after a node failure. Specifically, only lock clubs that were owned by the failed node are affected by the failure of the node. This effectively compartmentalizes the failures by club.

According to one embodiment, recovery domains are used in conjunction with lock clubs. Recovery domains are described in detail in U.S. patent application Ser. No. 08/672,348, entitled "Resource Management Using Resource Domains", filed on Jun. 25, 1996, the contents of which is incorporated herein by reference.

In general, a recovery domain is a set of one or more resources grouped together for recovery purposes. According to an embodiment of the invention, a recovery domain is established for each node in a multiple-node database system, and lock clubs that are mastered by each node are assigned to the recovery domain associated with the node. Assigning a lock club to a recovery domain effectively assigns all lock resources in the lock club to the recovery domain.

When a node dies, only those resources that belong to the recovery domain of the failed node need to be recovered. When the membership of recovery domains is established as described above, only the lock resources that belong to the lock clubs mastered on the failed node require recovery. Because mastery of lock clubs is determined based on which nodes are most interested in the resources covered by the lock clubs, the node most interested in the resources covered by the lock clubs of a failed node will typically be the failed node itself. Because the remaining nodes are less interested in the resources covered by the lock clubs in the recovery domain of the failed node, they will be less effected by the failure than they otherwise would be if resource mastery and recovery domain membership were randomly determined. The ability to limit recovery to those clubs that belong to a failed node is particularly important in the case of releasable lock resources, where almost the entire recovery domain would otherwise be affected.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for managing resources in a system that has multiple nodes, the method comprising the steps of:
    assigning each resource of a plurality of resources to a lock club of a plurality of lock clubs;
    assigning a master node to each lock club of said plurality of lock clubs;
    mastering all resources that belong to each lock club of said plurality of lock clubs at the master node assigned to the lock club;
    maintaining club-to-master mapping information that indicates the master node for each lock club of said plurality of lock clubs;
    determining which of said multiple nodes is a master node for a particular resource by inspecting the club-to-master mapping to determine the master node assigned to the lock club to which said particular resource belongs.

2. The method of claim 1 wherein:
    each lock club has a name;
    the method includes the step of storing the club-to-master mapping information for each lock club on a directory node that is selected for the lock club by applying a hash function to the name of the lock club.

3. The method of claim 1 further comprising the steps of:
    maintaining said club-to-master mapping information for all lock clubs of said plurality of lock clubs on all nodes of said multiple nodes by maintaining a complete club-to-master mapping with a name server; and
    replicating said club-to-master mapping of said name server on each of said multiple nodes.

4. The method of claim 3 wherein:
    the step of maintaining a complete club-to-master mapping with the name server includes the step storing information about a new lock club with said name server when said new lock club is created; and
    the step of replicating said club-to-master mapping includes said name server broadcasting to said multiple nodes said information about said new lock club.

5. The method of claim 1 wherein:
    ownership of a tablespace is assigned to a particular node of said multiple nodes;
    the step of assigning each resource of a plurality of resources to a lock club of a plurality of lock clubs includes assigning all resources within said tablespace to a particular lock club; and
    the step of assigning a master node to each lock club of said plurality of lock clubs includes assigning said particular lock club to said particular node.

6. The method of claim 1 further comprising the step of remastering a lock club that is currently mastered at a first node by:
    causing all resources that belong to said lock club to be mastered at a second node; and
    updating said club-to-master mapping to indicate that said lock club is mastered at said second node.

7. The method of claim 6 wherein the step of remastering includes the steps of:
    sending a remastering message to all nodes that are currently interested in the lock club;
    waiting for responses from the interested nodes, said responses acknowledging receipt of the remastering message;
    in response to said remastering message, the interested nodes suspending sending any lock resource related requests for the lock resources that belong to the lock club;
    after receiving responses from all interested nodes, moving data structures associated with the lock club and the lock resources within the lock club to the second node; and
    after moving said data structures to the second node, sending messages to all interested nodes to indicate that the second node is available to handle lock requests for lock resources that belong to the club.

8. The method of claim 7 further comprising the steps of:
    after receiving responses from said interested nodes and before completely moving said data structures to said second node, said first node receiving a lock request for a resource that belongs to said lock club;
    the second node responding to said lock request with a message indicating that the lock club is in the process of being remastered; and
    establishing the node that sent said lock request as an interested node.

9. The method of claim 6 wherein the step of remastering is performed automatically in response to the first node determining that the second node is the only node that holds any lock resources in the club.

10. The method of claim 6 wherein the step of remastering is performed automatically in response to ownership of a partition whose resources belong to said lock club being transferred from said first node to said second node.

11. The method of claim 6 wherein the step of remastering is performed automatically in response to detecting that memory on said first node for storing lock resource information has fallen below a predetermined threshold.

12. The method of claim 1 further comprising:
    establishing a plurality of resource domains;
    assigning each lock club to a resource domain based on whether the lock club is mastered at the node that is responsible for the resource domain.

13. A computer-readable medium carrying one or more sequences of instructions for managing resources in a system that has multiple nodes, wherein execution of the one or more sequences of instructions by one or more processors causes the one or more processors to perform the steps of:
    assigning each resource of a plurality of resources to a lock club of a plurality of lock clubs;

assigning a master node to each lock club of said plurality of lock clubs;

mastering all resources that belong to each lock club of said plurality of lock clubs at the master node assigned to the lock club;

maintaining club-to-master mapping information that indicates the master node for each lock club of said plurality of lock clubs;

determining which of said multiple nodes is a master node for a particular resource by inspecting the club-to-master mapping to determine the master node assigned to the lock club to which said particular resource belongs.

14. The computer-readable medium of claim 13 wherein:

each lock club has a name;

the computer-readable medium includes instructions for performing the step of storing the club-to-master mapping information for each lock club on a directory node that is selected for the lock club by applying a hash function to the name of the lock club.

15. The computer-readable medium of claim 13 further comprising instructions for performing the steps of:

maintaining said club-to-master mapping information for all lock clubs of said plurality of lock clubs on all nodes of said multiple nodes by maintaining a complete club-to-master mapping with a name server; and replicating said club-to-master mapping of said name server on each of said multiple nodes.

16. The computer-readable medium of claim 15 wherein:

the step of maintaining a complete club-to-master mapping with the name server includes the step storing information about a new lock club with said name server when said new lock club is created; and the step of replicating said club-to-master mapping includes said name server broadcasting to said multiple nodes said information about said new lock club.

17. The computer-readable medium of claim 13 wherein:

ownership of a tablespace is assigned to a particular node of said multiple nodes;

the step of assigning each resource of a plurality of resources to a lock club of a plurality of lock clubs includes assigning all resources within said tablespace to a particular lock club; and the step of assigning a master node to each lock club of said plurality of lock clubs includes assigning said particular lock club to said particular node.

18. The computer-readable medium of claim 13 further comprising instructions for performing the step of remastering a lock club that is currently mastered at a first node by:

causing all resources that belong to said lock club to be mastered at a second node; and updating said club-to-master mapping to indicate that said lock club is mastered at said second node.

19. The computer-readable medium of claim 18 wherein the step of remastering includes the steps of:

sending a remastering message to all nodes that are currently interested in the lock club;

waiting for responses from the interested nodes, said responses acknowledging receipt of the remastering message;

in response to said remastering message, the interested nodes suspending sending any lock resource related requests for the lock resources that belong to the lock club;

after receiving responses from all interested nodes, moving data structures associated with the lock club and the lock resources within the lock club to the second node; and after moving said data structures to the second node, sending messages to all interested nodes to indicate that the second node is available to handle lock requests for lock resources that belong to the club.

20. The computer-readable medium of claim 19 further comprising instructions for performing the steps of:

after receiving responses from said interested nodes and before completely moving said data structures to said second node, said first node receiving a lock request for a resource that belongs to said lock club;

the second node responding to said lock request with a message indicating that the lock club is in the process of being remastered; and establishing the node that sent said lock request as an interested node.

21. The computer-readable medium of claim 18 wherein the step of remastering is performed automatically in response to the first node determining that the second node is the only node that holds any lock resources in the club.

22. The computer-readable medium of claim 18 wherein the step of remastering is performed automatically in response to ownership of a partition whose resources belong to said lock club being transferred from said first node to said second node.

23. The computer-readable medium of claim 18 wherein the step of remastering is performed automatically in response to detecting that memory on said first node for storing lock resource information has fallen below a predetermined threshold.

24. The computer-readable medium of claim 13 further comprising instructions for performing the steps of:

establishing a plurality of resource domains;

assigning each lock club to a resource domain based on whether the lock club is mastered at the node that is responsible for the resource domain.

* * * * *